United States Patent [19]

Bellefleur

[11] Patent Number: 4,665,300
[45] Date of Patent: May 12, 1987

[54] MINI WIRE FEEDER

[75] Inventor: Richard N. Bellefleur, Sabattus, Mass.

[73] Assignee: Bath Iron Works Corporation, Bath, Me.

[21] Appl. No.: 813,635

[22] Filed: Dec. 26, 1985

[51] Int. Cl.⁴ .............................................. B23K 9/12
[52] U.S. Cl. ................................ 219/137.2; 219/136; 219/137.71
[58] Field of Search ................ 219/137.2, 136, 137.31, 219/137.71

[56] References Cited

U.S. PATENT DOCUMENTS 3,529,127  9/1970  Smith ............................ 219/137.31
4,508,954  4/1985  Kroll ................................... 219/136

FOREIGN PATENT DOCUMENTS 2053391  4/1971  France ............................ 219/137.31
47-13125  4/1972  Japan ................................ 219/137.2

Primary Examiner—Clifford C. Shaw
Attorney, Agent, or Firm—Shlesinger Arkwright Garvey & Fado

[57] ABSTRACT

A compact wire feeder and arc welding control unit including, a portable housing having a base portion, a side portion and a removable cover portion. A wire feeder is included in the unit, for feeding filler metal wire or the like, and is disposed within the housing proximate one side of the housing so that when the removable cover portion is removed, the wire feeder is easily accessed by the operator. A gas line is positioned on a second side of the housing opposite the wire feeder and has with it a gas line valve. A feed wire motor for driving the wire feeder is disposed intermediate the gas line and the wire feeder. A circuit board is disposed above the motor intermediate the gas line and the wire feeder. A wire real housing is fixed to the side portion of the housing and communicates with the housing so that wire may be fed of a real in the real housing and fed into the wire feeder. A ground wire clip with an associated ground wire is connected within the housing to electrical ground potential by means of an electrical wire. The ground wire passes out of the housing through the housing side portion adjacent the gas line.

19 Claims, 5 Drawing Figures

MINI WIRE FEEDER

BACKGROUND OF THE INVENTION

The present invention relates to a compact electrode wire feeding device and arc welding control unit which together are arranged in a small portable pack.

In the past, where continuous welding operations were to be performed, it was necessary to move several large pieces of equipment to the site where welding was to take place. Several of these pieces of equipment had to be hung-up or placed out of the way of the welder or operator as they were bulky and included wires or the like extending back to a main welding grid. If there was an electrical problem, such as a blown fuse, the welder or operator would have to leave the welding site and go back to the welding grid.

The welding implements taught by the prior art had several drawbacks. The welding implement or welding gun was typically hand held by the welder or operator, and included a barral portion, a wire feeder, a handle including a trigger to actuate the wire feeder and a reel box for carrying a spool or reel which was positioned on the back of the gun. These guns had the disadvantage that their length, which included the length of the reel box and a wire feeder precluded welding in confined areas.

U.S. Pat. No. 2,767,302 issued to Brashear discloses a portable wire feed mechanism and an attached welding gun. The portable wire feed device tought by Brashear has a wire feed mechanism which is mounted on the top of the portable wire feed device and therefore exposed to the elements and debris which may be in the vicinity of the work site and, possibly cause the wire feed mechanism to get fouled. The control unit, motor and the like taught by Brashear are positioned within the wire feed housing such that they are not easily accessible to the operator.

U.S. Pat. No. 3,038,990 to Cotter et al, U.S. Pat. No. 3,143,633 to Wadleig and U.S. Pat. No. 3,730,136 to Okada each teach welding gun units which can be carried by an operator or welder and include a nozzle, a wire feed means, a handle, a trigger actuating the wire feed means and a wire reel housing. As discussed above, the length of these units makes it difficult for the operator or welder to weld in confined places.

SUMMARY AND OBJECTS OF THE INVENTION

It is an object of the invention to provide a wire feeder and arc welding control unit which is compact, portable and may be maintained at a distance spaced from an arc welding gun.

It is another object of the invention to provide a wire feeder and arc welding control unit wherein a wire feeder is housed such that the wire feeder will be protected from debris and the like at the work site and also so that an operator or welder may easily gain access to the wire feeder in order to change wire to be fed or maintain the wire feeder in proper working order.

It is another object of the invention to provide a wire feeder and arc welding control unit which is easily managable and light enough so that an operator or welder may hold the wire feeder and arc welding control unit in one hand while simultaneously welding with an arc welding gun in the other hand.

Yet another object of the invention is to provide a wire feeder and arc welding control unit having a shoulder support strap which enables an operator to support the wire feeder and arc welding control unit and have both hands free to use for welding operations.

Another object of the invention is to provide a wire feeder arc welding control unit which is supported by means of a shoulder strap and includes a cushion portion adapted to conform to a hip of an operator.

Still another object of the invention is to provide a system for positioning a wire feed means, a gas line, a gas line valve, an electrical line, a wire feed motor, a circuit board having fuses associated therewith, a wire reel, and an electrical grounding means within a portable housing so that these elements accumulatively will take up as little space as possible while simultaneously being arranged so as to allow easy access to these elements.

Another object of the invention is to provide a housing for a wire feeder and arc welding control unit having a wire reel housing associated therewith and having on the exterior part of the housing a wire feed adjustment knob means and on/off toggle switch and on the interior of the housing fuses positioned so that they are easily accessible when the housing is opened.

In summary, this invention relates to a compact wire feeder and arc welding control unit including, a portable housing having a base portion, a side portion and a removable cover portion. A wire feed means, for feeding filler metal wire or the like, is disposed within the housing proximate one side of the housing so that when the removable cover portion is removed, the wire feed means is easily accessed by the operator. A gas line is positioned on a second side of the housing opposite the wire feeder and has with it a gas line valve. An electrical line enters the side portion of the housing adjacent the gas line. A feed wire motor means for driving the wire feed means is disposed intermediate the gas line and the wire feed means. A circuit board is disposed above the motor means intermediate the gas line and the wire feed means. A wire reel housing is fixed to the side portion of the housing and communicates with the housing so that wire may be fed off a reel in the reel housing and fed into the wire feed means. A ground wire is connected within the housing to electrical ground potential by means of the electrical wire. The ground wire passes out of the housing through the housing side portion adjacent the gas line.

BRIEF DESCRIPTION OF THE DRAWINGS

These and other objects of the present invention will be apparent from a study of the drawings in which the following figures are noted.

DESCRIPTION OF THE PREFERRED EMBODIMENT

Figure 1:
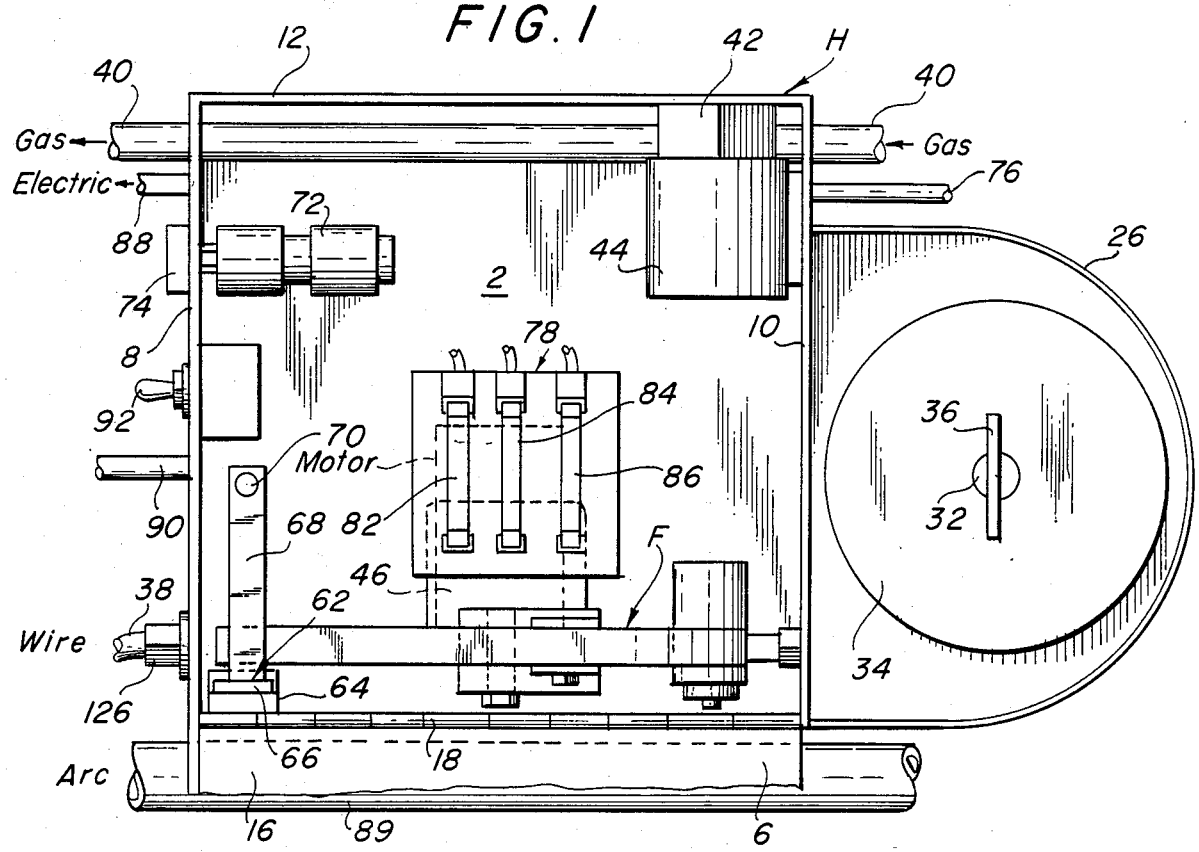
FIG. 1 is a top plan view of the wire feeder and arc weld control unit shown with a broken-away cover portion in an open position.
Figure 2:
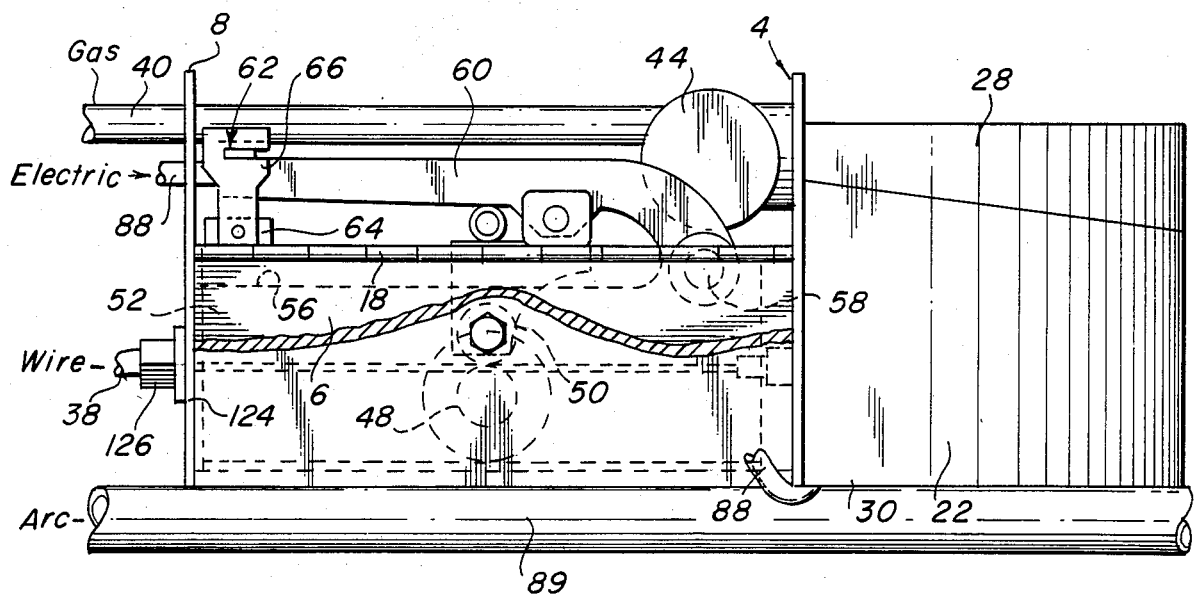
FIG. 2 is a side elevational view showing a cover portion in an open position.

A housing H, shown in FIGS. 1 and 2, includes a base portion 2, a side portion 4, and a removable or openable cover portion 6. Side portion 4 includes front end 8, back end 10, right side 12 and left side 14. Cover portion 6 has a flange 16 which extends from the top portion towards the base portion and pivotally engages the edge of left side 14, which is closest to the top portion, by means of hinge 18. Through this design, when top portion or cover portion 6 is removed and articulated about hinge 18 a large portion of the interior of the housing is exposed including the portion that was once covered by flange 16. To insure that the interior of the housing H is accessible from the left side, left side 14 of side portion 4 extends a fraction of the distance between the base and the top portion and flange 16 extends a fraction of the distance from top portion 6 to base portion 2.

Fixed to back end 10 of side portion 4 is a reel housing or spool housing 20. Spool housing 20, includes an arcuate end wall 22, side walls 24 and 26, top wall 28 and base wall 30. A spindle 32 is positioned within spool or reel housing 20 so that it may receive a reel or spool 34. An adjusting means 36 acts to tighten spindle 32 so as to retard spindle 32's movement. By use of this adjusting means, the tension of electrode wire 38 may be adjusted.

A gas line 40 enters side portion 4 through back end 10 and is positioned within housing H proximate right side 12 of side portion 4. Gas line 40 passes out of the housing H through the front end 8 of side portion 4. Associated with gas line 40 is a gas valve 42 positioned proximate right side 12 and the back end 10 of side portion 4. Gas valve 42 regulates the flow of gas through gas line 40 so that in a first position gas valve 42 permits flow through gas line 40 and in a second position gas valve 42 prevents flow through gas line 40. A gas valve solenoid 44 shifts the gas valve between the first open position and second closed position dependent on whether welding is taking place or not.

Wire feed assembly, generally designated F, comprises essentially, drive motor 46, driving roller 48, driven by drive motor 46 and at least one pressure roller 50. Drive roller 46 is mounted in a bracket or drive roller support 52. Bracket or drive roller support 52 is welded or otherwise secured to the base portion 2 adjacent the left side 14 of side portion 4. Bracket or support 52 has two ends, a first end 54 contiguous with and bolted or the like to the base portion 2 and a second end or free end 56 which is adjacent the top portion or cover portion 6. Associated with the free end 56 is a pivot member or hinge member 58 which receives a support arm 60. Support arm 60 articulates about pivot member or hinge member 58 and carries pressure roller 50 so that pressure roller 50 may be moved into engagement with drive roller 48 and out of engagement with drive roller 48. Pivot member or hinge member 58 is adjacent back end 10 and left side 14 of side portion 4.

Adjacent front end 8 of side portion 4 is a clamping member 62 supported by clamping member support 64. Clamping member 64 includes clamping clip 66 and clamping bar 68. Clamping bar 68 pivots about a pin 70 mounted in a clamping member support 64. Clamping member 62 is used to retain support arm 60 in a fixed position which corresponds to a position where pressure roller 50 is engaging drive roller 48. When pressure roller 50 is to be moved out of engagement with drive roller 48, clamping bar 68 is pivoted about pin 70 in a plane substantially parallel to the plane of the base portion 2. Support arm 60 is then free to pivot about pivot member or hinge member 58. The above mentioned articulation of support arm 60 disengages pressure roller 50 from drive roller 48.

A rheostat device 72 is positioned adjacent the right side 12 and front end 8 of side portion 4. Rheostat 72 regulates the speed of drive motor 46. A wire feed adjustment knob 74, actuates the rheostat and is located outside the housing H on the face of front end 8 of side portion 4.

A main AC electrical power line 76 enters the housing H through the back end 10 of side portion 4 proximate base portion 2. Power line 76 enters housing H below gas line 40 thereby, enabling gas valve 42 and gas valve solenoid 44, associated with gas line 40, to be positioned above power line 76 so they are accessible to the operator. Electrical line 76 leads to a circuit board or wire center 78 which includes a fuse board 80 for receiving fuses 82, 84 and 86. The fuse board 80 is positioned above drive motor 46 adjacent top portion or cover portion 6 so that when cover portion 6 is removed, the fuses 82, 84 and 86 are readily accessible to the operator.

An electrical ground wire 88 is provided for grounding the object to be welded. Electrical ground wire 88 enters housing H through left side 14 of side portion 4. The electrical ground wire 88 is connected to a main arc power line 89 outside of housing H and is connected within housing H to circuit board or wire center 78. Main arc power line 89 may be secured to the exterior of housing H by means of arc power line securing loops 91 and 93. A gun trigger switch wire 90 is provided, connecting the gun trigger (not shown) to circuit board or wire center 78. An on/off toggle switch 92 controls the power to circuit board or wire center 78.

FIG. 3

Figure 3:
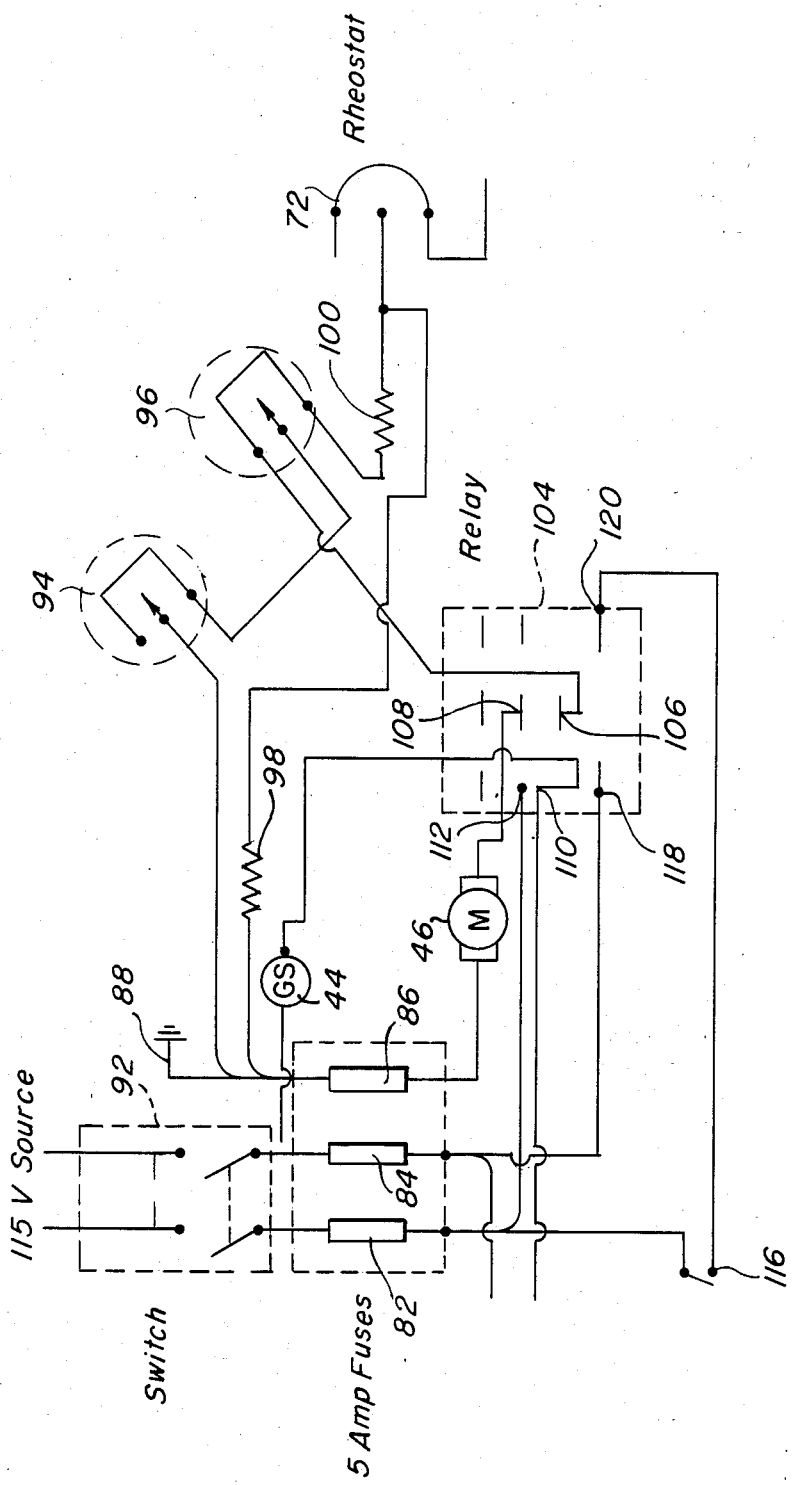
FIG. 3 is a diagram showing the control circuit of the apparatus in accordance with the invention.
Figure 4:
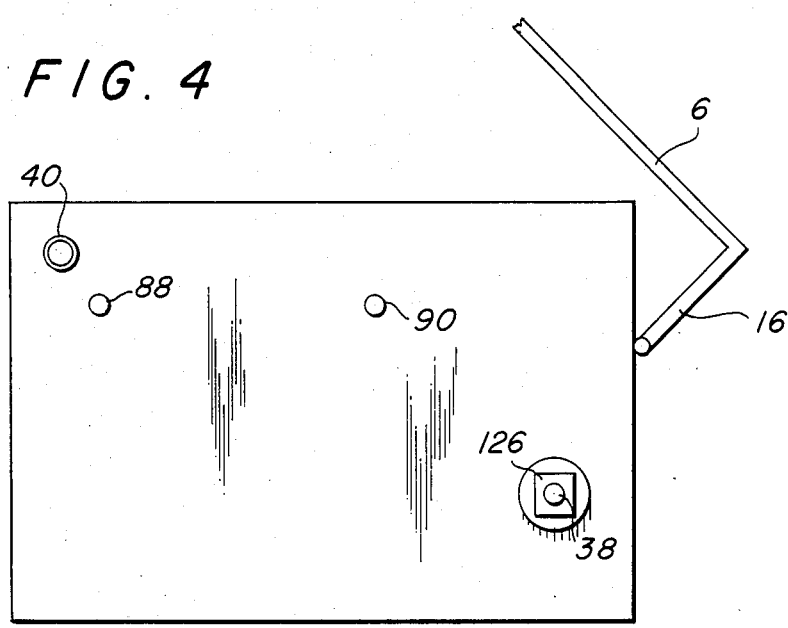
FIG. 4 is a front elevational view showing in phantom a cover portion in an open position.
Figure 5:
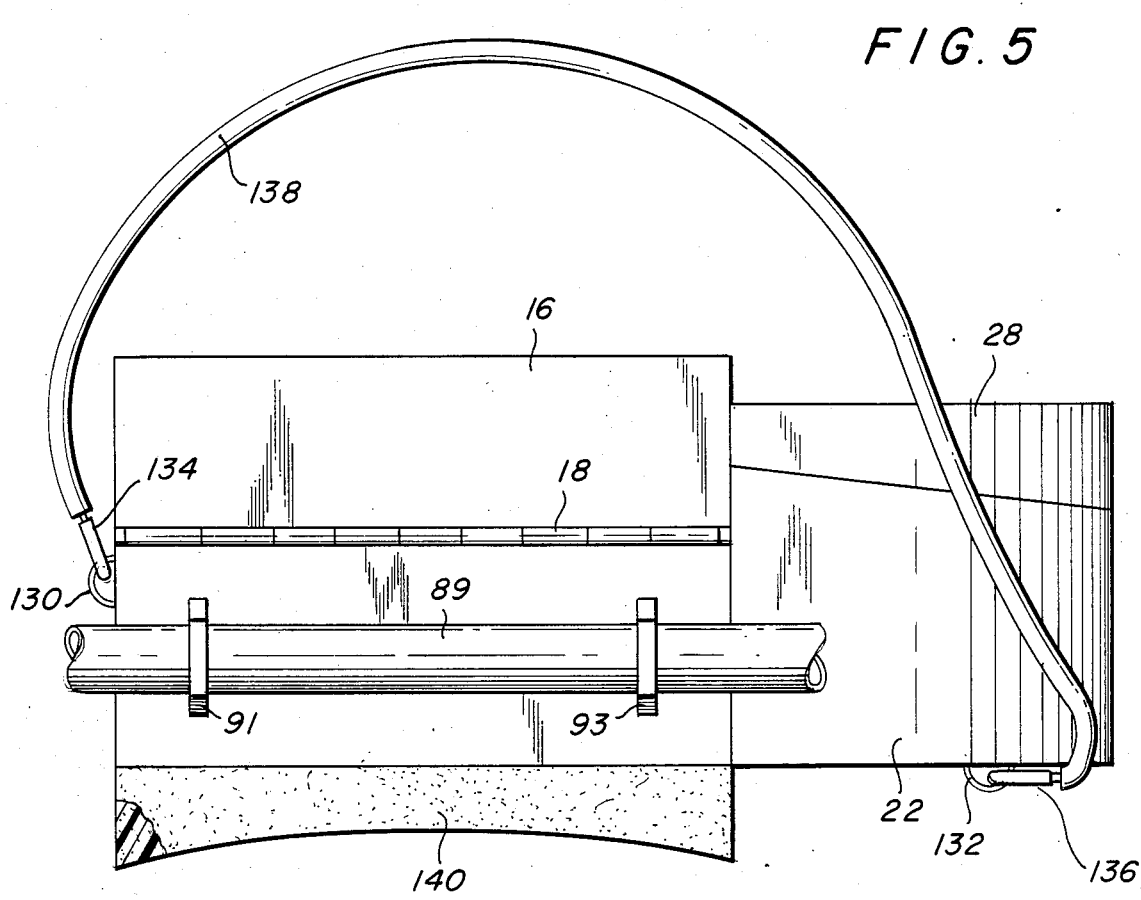
FIG. 5 is another side view of the wire feeder.

FIG. 3 is a wire diagram showing how the different components of the device interrelate. A 115 volt AC source is connected to switch 92, so that the power to the device may be turned on and off. Zener diodes 94 and 96 cooperate with resistors 98 and 100 to regulate the voltage acrossed motor 46. Rheostat 72 cooperates with zener diodes 94 and 96 and resistors 98 and 100 to change the speed of motor 46. Fuse 86 acts to interrupt the flow of current to motor 46 when the amperage of the current exceeds a predetermined value. Motor 46 is connected to relay 104 at relay pins 106 and 108.

Gas solenoid 44 is connected to relay 104 at pins 110 and 118. A gas solenoid fuse 84 is connected to the gas solenoid 44 so that when the flow of current to the gas valve solenoid 44 exceeds a predetermined amperage value, the flow of current to gas solenoid 44 is interrupted.

Gun trigger switch 116 is connected to relay 104 at relay pins 112 and 120. When gun trigger switch 116 is closed, relay 104 connects pins 106 and 108 thereby powering the motor 46 and also connects pins 110 and 118 thereby operating gas solenoid 44.

A switch fuse 82 is connected to the 115 volt AC source through switch 92. When the flow of current through switch fuse 82 exceeds a predetermined amperage value, the flow of current is interrupted.

Operation

In operation, a welder or operator, places a reel or spool 34, carrying electric or filler wire 38, on spindle 32. A portion of the wire is then reeled off spool 34 through a hole 122 in back end 10 of side portion 4. Clamping bar 68 is then pivoted about pin 70 so that support arm 60 may be pivoted about pivot or hinge member 58. Electrode wire or filler wire 38 is then passed over drive roller 48 and through hole 124 in front end 8 of side portion 4. Support arm 60 is swung about pivot or hinge member 58 so that clamping bar 68 may pivot about pin 70 and engage clamping clip 66 thereby holding support arm 60 and positioning pressure roller 50 so as to be in engagement with electrode wire or filler wire 38 and driving roller 48. Electrode wire or filler wire 38 is then advanced through hollow tubing 126 until the leading end of electode wire or filler wire 38 reaches the tip or nozzle of the welding gun (not shown).

When the electrode wire or filler wire 38 has been properly fed through the wire feed assembly F as described above, welding operations may begin. The operator or welder first clips or connects electrical ground 88 to the article to be welded. On/off toggle 92 is then switched to the on position and wire feed adjustment knob 74 is positioned to insure the proper wire feed speed. The operator or welder may then pull gun trigger switch 116 on the welding gun (not shown) and start welding with one hand while holding housing H in another hand. The welder may also position housing H close to the article to be welded while manipulating the welding gun.

Additionally, a shoulder strap support 130, riveted or the like to front end 8 of side portion 4, and shoulder strap support 132, riveted or the like to the base of reel housing, are adapted to engage clamps 134 and 136 of shoulder strap 138 respectively. Further, a resilient cushioned portion 140 is secured to the exterior of base portion 2 and adapted to conform to a hip of the operator. For example, the operator may support the wire feeder and arc welding control unit by means of the shoulder strap 138, while allowing the housing H to rest against the operators hip or the like by means of cushion portion 140.

While this invention has been described as having preferred design, it is understood that it is capable of further modifications, uses and/or adaptations of the invention following in general the principle of the invention and including such departures from the present disclosure as come within known or customary practice in the art to which the invention pertains, and as may be applied to the essential features set forth, and fall within the scope of the invention of the limits of the appended claims.

What is claimed is:

1. A compact wire feeder and arc welding control unit for use in arc welding or the like comprising:
   (a) a portable housing having a base portion and a removable cover portion, said base portion including right and left sides, a bottom, and front and back ends;
   (b) wire feed means for feeding filler metal wire or the like disposed within said housing proximate said left side,
   (c) a gas line, entering said housing through said back end, disposed within said housing proximate said right side and passing out of said housing through said front end;
   (d) a gas line valve associated with said gas line and disposed proximate said housing right side and back end;
   (e) an electrical line entering said housing through said back end adjacent said right side;
   (f) wire feed motor means for driving said wire feed means disposed intermediate said right and left sides,
   (g) circuit board disposed above said motor means intermediate said right and left sides;
   (h) a wire reel housing fixed to said back end and in communication with said portable housing through an opening in said back end;
   (i) means for supporting a wire reel, positioned within said wire reel housing;
   (j) a ground wire means, for grounding an article to be welded, connected within said portable housing to electrical ground potential by means of said electrical wire, said ground wire means passing out of said housing through said front end adjacent said right side;
   (k) said wire feed motor means, said circuit board and said means for supporting a wire reel being positioned on a line substantially in the center of said wire feeder and an arc welding control unit; and,
   (l) said left side of said base portion extending upwardly from said bottom of said base portion a fraction of the distance between said bottom of said base portion and said cover portion;
   (m) said right side extending upwardly from said bottom of said base portion a distance substantially greater than said left side;
   (n) said cover portion including a flange extending downwardly towards said bottom of said base portion;
   (o) said flange being articulated to said left side whereby, when said cover portion is removed said flange is moved in an articular manner with respect to said left side, thereby making said wire feeder means readily accessible.

2. A compact wire feeder and arc welding control unit as in claim 1, further comprising:
   (a) wire feed adjustment means for adjusting the speed of said motor means.

3. A compact wire feeder and arc welding control unit as in claim 2, wherein:
   (a) said wire feed adjustment means includes a wire feed adjustment knob means, positioned on said base portion, for actuating said wire feed adjustment means.

4. A compact wire feeder and control unit as in claim 1, wherein:
   (a) said wire feed adjustment means is an electrical rheostat device.

5. A compact wire feeder and arc welding control unit as in claim 1, wherein:
   (a) said circuit board includes means for receiving at least one fuse; and,
   (b) at least one fuse positioned in said means for receiving at least one fuse.

6. A compact wire feeder and control unit as in claim 5, wherein:
   (a) said means for receiving at least one fuse and said associated at least one fuse are positioned on said circuit board facing said removable cover portion so as to be easily accessible when said removable cover is removed.

7. A compact wire feeder and arc welding control unit as in claim 5, further comprising:
   (a) a gas valve solenoid for actuating said gas valve.

8. A compact wire feeder and arc welding control unit as in claim 7, wherein:
   (a) said at least one fuse includes a fuse connected so as to interrupt the flow of current to said gas valve solenoid when the amperage of said current exceeds a predetermined value.

9. A compact wire feeder and arc welding control unit as in claim 5, further comprising:
(a) switch means for connecting power to said circuit board.

10. A compact wire feeder and arc welding control unit as in claim 9, further comprising:
(a) a toggle, for actuating said switch means positioned on said front end of said base portion.

11. A compact wire feeder and arc welding control unit as in claim 9, wherein:
(a) said at least one fuse includes a fuse connected so as to interrupt the flow of current to said switch means when the amperage of said current exceeds a predetermined value.

12. A compact wire feeder and control unit as in claim 5, wherein:
(a) said at least one fuse includes a fuse connected so as to interrupt the flow of current to said feed wire motor means when the amperage of said current exceeds a predetermined value.

13. A compact wire feeder and control unit as in claim 1, further comprising:
(a) means, associated with said means for supporting a wire reel, for adjusting wire reel tension.

14. A compact wire feeder and arc welding control unit as in claim 13, wherein:
(a) said means for supporting a wire reel is a spindle for engagably receiving a wire reel; and,
(b) said means for adjusting wire reel tension comprises breaking means for retarding the movement of said spindle.

15. A compact wire feeder and arc welding control unit as in claim 1, wherein:
(a) said wire feed means comprises, at least one driving roller drivingly connected to said feed wire motor means;
(b) at least one pressure roller; and,
(c) means for moving and locking said pressure roller relative to said driving roller, the wire feeding of a wire reel may be positioned between said driving roller and said feed roller.

16. A compact wire feeder and arc welding control unit as in claim 15, wherein:
(a) said means for moving and locking said pressure roller relative to said drive roller includes a base member mounted on said housing base portion;
(b) a support arm having one end articulated to said base member and a second free end; and,
(c) means for locking said free end in position so that said pressure roller engages said drive roller.

17. A compact wire feeder and arc welding control unit as in claim 16, wherein:
(a) said means for locking said free end in position comprises, a clamping member; and,
(b) a clamping clip whereby said clamping member is positioned so as to clamp said free end of said support arm between said base member and the clamping member by clipping said clamping member with said clamping clip.

18. A compact wire feeder and arc welding control unit as in claim 1, further comprising:
(a) shoulder strap support means for supporting the wire feeder and arc welding control unit on an operators shoulder; and,
(b) resilient cushion means, fixed to said base portion and adapted for engaging a hip of operator.

19. A compact wire feeder and arc welding control unit as in claim 1, further comprising:
(a) means for securing an arc power line to said housing.

* * * * *